E. G. THOMAS.
CHILD'S TABLE UTENSIL.
APPLICATION FILED DEC. 10, 1918.
1,347,307.
Patented July 20, 1920.
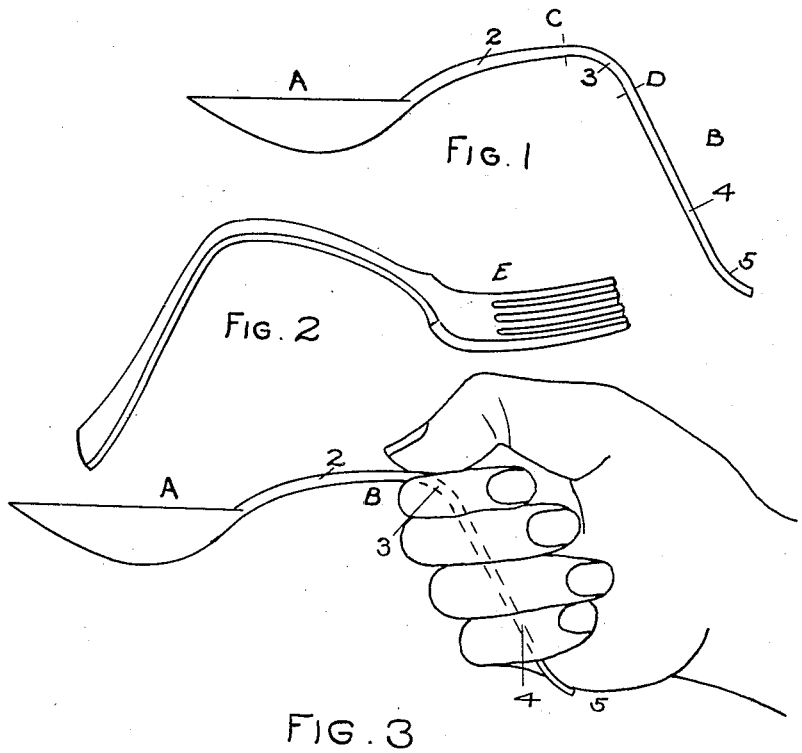
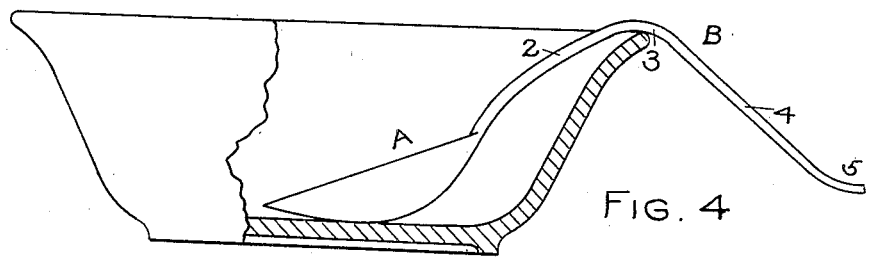
INVENTOR
Edward G. Thomas

UNITED STATES PATENT OFFICE.

EDWARD G. THOMAS, OF TOLEDO, OHIO.

CHILD'S TABLE UTENSIL.

1,347,307.

Specification of Letters Patent. Patented July 20, 1920.

Application filed December 10, 1918. Serial No. 266,118.

*To all whom it may concern:*

Be it known that I, EDWARD G. THOMAS, a citizen of the United States, residing at Toledo, in the county of Lucas and State of Ohio, have invented new and useful Improvements in Children's Table Utensils, of which the following is a specification.

My invention relates to improvements in table utensils, such as spoons, forks, etc., and more particularly table utensils for use by small children when learning to feed themselves.

When a child begins the use of a spoon, it has yet to learn the coördination of its mind and muscles which comes from experience and in consequence it is not able to carry food to its mouth in spoons of the usual construction without spilling much of it so that for a time self feeding is a messy and unpleasant operation. My invention is designed to provide table utensils especially adapted for use by inexperienced children and constructed and arranged to so fit the hand that the resistance to turning or tipping afforded by contact with the hand acts on a lever arm of considerable length; a natural and easy position of the hand presents the utensil to the mouth in a level position; the spoon cannot be completely filled with liquid; and the handle of the utensil is kept from the food. The result is that by the use of my improved table utensils the efficiency of the child's efforts is greatly increased and self feeding from the beginning is a cleanly operation.

In the drawings which accompany and form a part of this specification Figure 1 is a side elevation of a spoon constructed in accordance with my invention. Fig. 2 is a perspective view of a fork similarly constructed. Fig. 3 shows the spoon in use and held in a child's hand. Fig. 4 shows the spoon when placed in an ordinary sauce dish.

While my invention is equally valuable in connection with forks, etc. I will refer in the following description chiefly to spoons as these are the utensils usually first used.

The spoon consists of a bowl A of conventional form to which is attached a handle B, preferably provided with a neck portion 2 projecting upward and outward from the bowl to a point C distant about one-third the total length of the handle from the bowl, said neck portion uniting the bowl and the remaining or hand-receiving portion of the handle. At this point C the handle bends downward in a curve extending to the point D and having a radius approximating that of the cross-section of a child's finger, said curved part of the handle constituting a forefinger-engaging portion 3. From said forefinger-engaging portion 3 the handle extends downward and outward from the bowl A to a point considerably below the plane of the top of the bowl thereby forming a portion 4 adapted to register with the palm of the child, the end 5 of said palm-registering portion 4 being curved outward to correspond to the shape of the lower side of the palm. The spoon when in use therefore constitutes a bell-crank pivoted upon the forefinger, the downward force of the bowl A and contained food being balanced by the resistance of the lower part of the palm of the hand.

In the fork illustrated in Fig. 2, the food-carrying part E occupies the same relative position to the handle B as does the bowl A of the spoon, the handle portions having the same functions and relative positions as has been described in connection with the spoon.

The results of this arrangement of the bowl and hand-receiving portions of the handle are (1) That the child secures a very firm grip on the utensil since the forces which resist the tendency of the utensil to tip longitudinally or transversely act through a lever arm measured by the distance from the forefinger-engaging portion 3 to the end of the handle at 5;

(2) The child will bring the spoon to its mouth in a level position without conscious effort;

(3) The bowl of the spoon cannot be inserted in a level position into the food contained in a dish because the edge of the dish will interfere with the hand. Therefore the spoon cannot be filled brimful of liquid, a very great advantage, for, on account of the uncertain movements of the child, a part of the contents of a completely filled spoon will be spilled between the dish and the mouth. With a spoon constructed according to my invention, the spoon, starting from the dish in a somewhat inclined position will continually approach a level position as it is raised and the likelihood of spilling is reduced to a minimum.

(4) The spoon may be dropped into the dish by the child without danger that the handle thereof will fall into the food and become soiled. If any part of the palm-registering portion 4 extends over the edge of the dish when released by the child the spoon will move outward until the forefinger-engaging portion 3 rests upon the edge of the dish, thus automatically keeping that part of the handle which touches the hand outside the dish and away from the food.

Self feeding therefore automatically becomes a cleanly and efficient operation and a child rapidly acquires the art of carrying its food to its mouth.

I claim:

1. A child's table utensil including a handle, said handle having a neck and a forefinger-engaging portion and palm-registering portion, arranged at an angle thereto and adapted to contact with the ulnar side of the palm.

2. A child's table utensil including a food-carrying part and a handle comprising a neck portion located above the plane of said food-carrying part and a hand receiving portion extending away from said food-carrying part and below the plane thereof and adapted to contact with the ulnar side of the palm.

3. A child's table utensil including a food-carrying part and a handle comprising a neck portion extending away from said food-carrying part and above the plane thereof for a minor part of the entire length of the handle and a hand-receiving portion extending thence for a major part of the entire length of the handle to a point considerably below the plane of said food-carrying part, said hand receiving portion being approximately at right angles to said neck portion.

4. In a child's table utensil, a food-carrying member and a handle extending at its inner end in the usual direction for a distance of ⅓ to ½ its length and extending thence downwardly in an approximately straight line at an obtuse angle with the inner portion of the handle, the outer end of said handle being adapted to contact with the ulnar side of the palm.

EDWARD G. THOMAS.